United States Patent
Lenzi et al.

(10) Patent No.: US 12,433,771 B1
(45) Date of Patent: Oct. 7, 2025

(54) POWERED PROSTHESIS WITH TORQUE-SENSITIVE ACTUATION

(71) Applicant: University of Utah Research Foundation, Salt Lake City, UT (US)

(72) Inventors: Tommaso Lenzi, Salt Lake City, UT (US); Lukas R. Gabert, Salt Lake City, UT (US); Brendon M. Ortolano, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 19/081,516

(22) Filed: Mar. 17, 2025

(51) Int. Cl.
*A61F 2/70* (2006.01)
*A61F 2/50* (2006.01)
*A61F 2/64* (2006.01)

(52) U.S. Cl.
CPC ............... *A61F 2/70* (2013.01); *A61F 2/64* (2013.01); *A61F 2002/5038* (2013.01); *A61F 2002/5075* (2013.01)

(58) Field of Classification Search
CPC ...... A61F 2/64; A61F 2/70; A61F 2002/6836; A61F 2002/6845
See application file for complete search history.

(56) References Cited

U.S. PATENT DOCUMENTS

| | | | |
|---|---|---|---|
| 2016/0158029 A1* | 6/2016 | Kuiken | A61F 2/64 623/24 |
| 2021/0298922 A1* | 9/2021 | Sun | A61F 2/64 |
| 2021/0338458 A1 | 11/2021 | Lenzi et al. | |
| 2022/0323240 A1 | 10/2022 | Seifert et al. | |
| 2023/0050006 A1 | 2/2023 | Pickerill et al. | |
| 2023/0092812 A1 | 3/2023 | Goldfarb et al. | |
| 2023/0398003 A1 | 12/2023 | Gregg et al. | |

FOREIGN PATENT DOCUMENTS

| | | | |
|---|---|---|---|
| CN | 114191152 | 3/2022 | |
| TW | M240201 U | * 8/2004 | |
| WO | WO-2010027968 A2 | * 3/2010 | ............... A61F 2/60 |

OTHER PUBLICATIONS

Best et al., Data-Driven Variable Impedance Control of a Powered Knee-Ankle Prosthesis for Adaptive Speed and Incline Walking, IEEE Transactions on Robotics, 2022, 19 pages.
(Continued)

*Primary Examiner* — Christie Bahena
(74) *Attorney, Agent, or Firm* — Thorpe North & Western, LLP.

(57) ABSTRACT

A powered prosthesis device includes an artificial joint body, pivotal about a joint axis, an input motor, and a transmission, operable to transfer force from the input motor to the artificial joint body. The transmission includes a crank, pivotally coupled to the artificial joint body about a crank axle rotatable about a crank axis. The input motor is operably coupled to the crank such that movement of the input motor causes the crank to pivot about the crank axis. A primary compression spring is carried by the artificial joint body, the primary compression spring being operably coupled to the crank. Movement of the input motor results in the crank transferring force to the artificial joint body about the crank axle and through the primary compression spring to cause the artificial joint body to pivot about the artificial axis.

16 Claims, 10 Drawing Sheets

(56) References Cited

OTHER PUBLICATIONS

Culver et al., A new approach to a powered knee prosthesis: Layering powered assistance onto strictly passive prosthesis behavior, Wearable Technologies, vol. 4, e21, 2023, 21 pages.

Elery et al., Design and Benchtop Validation of a Powered Knee-Ankle Prosthesis with High-Torque, Low-Impedance Actuators, ResearchGate Conference Paper, 2018, 9 pages, https://www.researchgate.net/publication/327805193.

Lee et al., The effects of swing assistance in a microprocessor-controlled transfemoral prosthesis on walking at varying speeds and grades, Wearable Technologies, vol. 4, e9, 2023, 13 pages.

Lenzie et al., Actively Variable Transmission for Robotic Knee Prostheses, ResearchGate Conference Paper, 2017, 8 pages, https://www.researchgate.net/publication/317585732.

Mooney, The Use of Series Compliance and Variable Transmission Elements in the Design of a Powered Knee Prosthesis, SB Mechanical Engineering, Massachusetts Institute of Technology, 2012, 73 pages.

Martinez-Villalpando et al., Agonist-antagonist active knee prosthesis: A preliminary study in level-ground walking, Journal of Rehabilitation Research & Development, vol. 46, No. 3, 2009, 13 pages.

Sanz-Morere et al., An active knee orthosis with a variable transmission ratio through a motorized dual clutch, Mechatronics 94, 103018, 2023, 13 pages, https://doi.org/10.1016/j.mechatronics.2023.103018.

Sun et al., Variable Transmission Series Elastic Actuator for Robotic Prosthesis, IEEE International Conference on Robotics and Automation (ICRA), 2018, 1 page, Abstract only.

Tessari et al., Knee prosthesis powered by a fully integrated and highly back-drivable electro-hydrostatic actuator, Mechatronics 91, 102972, 2023, 12 pages, https://doi.org/10.1016/j.mechatronics.2023.102972.

Zhu et al., Design and experiment of a variable stiffness prosthetic knee joint using parallel elastic actuation, Robotics and Autonomous Systems 171, 104566, 2024, 14 pages, https://doi.org/10.1016/j.robot.2023.104566.

\* cited by examiner

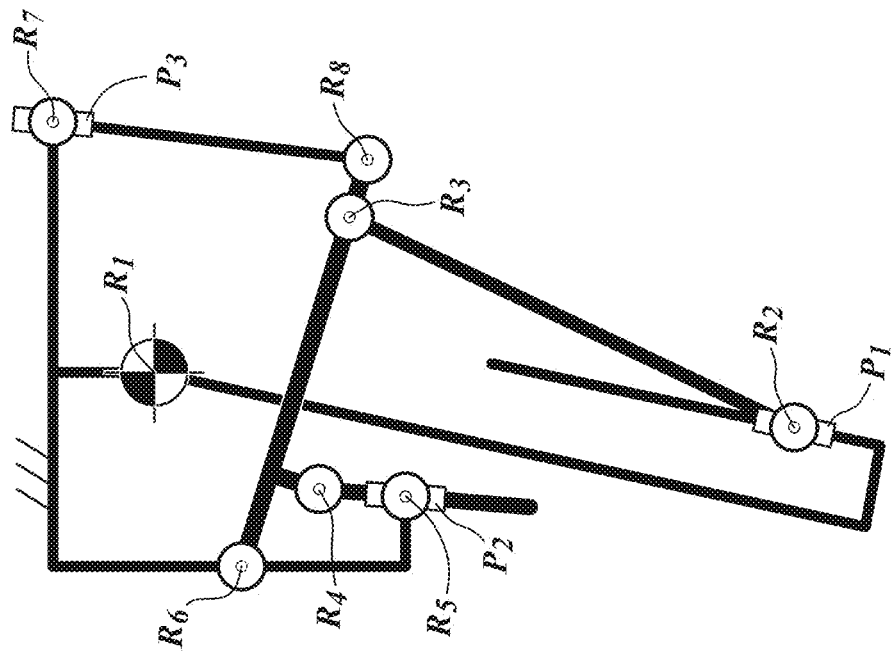
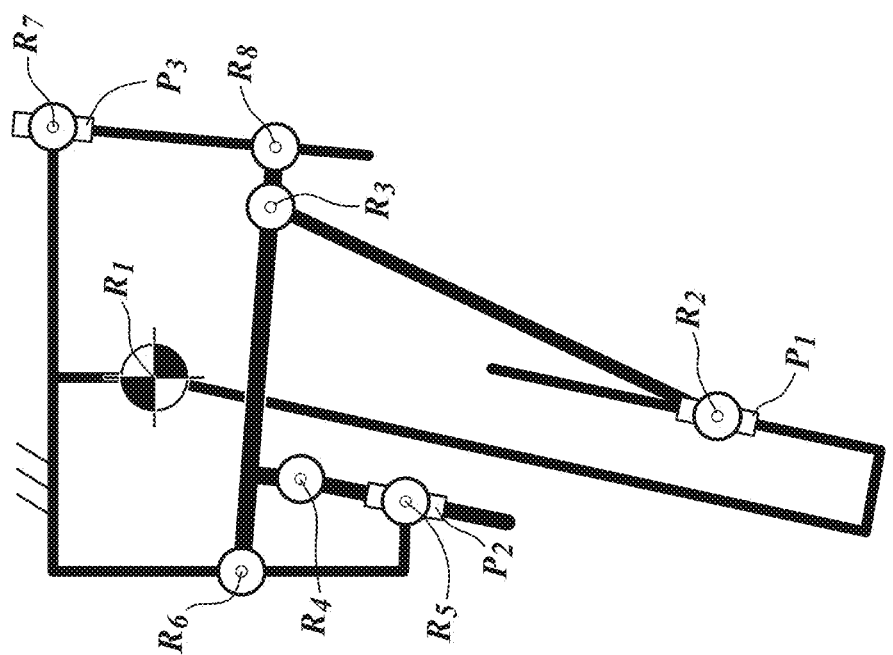

POWERED PROSTHESIS WITH TORQUE-SENSITIVE ACTUATION

STATEMENT REGARDING FEDERALLY SPONSORED RESEARCH OR DEVELOPMENT

This invention was made with government support under W81XWH-21-1-0037 awarded by the Defense Health Agency, Medical Research and Development Branch, and R01 HD098154 awarded by the National Institutes of Health. The government has certain rights in the invention.

CROSS REFERENCE TO RELATED APPLICATIONS

Not Applicable.

NAMES OF THE PARTIES TO A JOINT RESEARCH AGREEMENT

Not applicable.

INCORPORATION BY REFERENCE STATEMENT

Not applicable.

BACKGROUND

Powered prostheses are a compelling technology for individuals with amputation due to their ability to provide net positive energy and actively generate movements with their embedded actuators. However, powered prostheses have been unable to achieve clinical or commercial success due to the drawbacks of robotic actuators. Compared to commercial Microprocessor-Controlled Knees (MPKs), existing powered solutions have been too weak, too loud, too heavy, or exhibit high impedance, preventing amputee adoption.

SUMMARY

This invention relates to a powered prosthesis device, including an artificial joint body, pivotal about a joint axis and an input motor. A transmission can be operable to transfer force from the input motor to the artificial joint body. The transmission can include a crank, pivotally coupled to the artificial joint body about a crank axle rotatable about a crank axis, the input motor being operably coupled to the crank such that movement of the input motor causes the crank to pivot about the crank axis. A primary compression spring can be carried by the artificial joint body, the primary compression spring being operably coupled to the crank. Movement of the input motor results in the crank transferring force to the artificial joint body through the crank axle and through the primary compression spring to cause the artificial joint body to pivot about the joint axis.

In accordance with another aspect of the technology, a powered prosthesis device is provided, including an artificial joint body, pivotal about a joint axle rotatable about a joint axis and an input motor. A transmission can be operable to transfer force from the input motor to the artificial joint body. The transmission can include a crank, pivotally coupled to the artificial joint body about a crank axle rotatable about a crank axis, the input motor being rotatably coupled to the crank such that movement of the input motor causes the crank to pivot about the crank axis, the crank axis and the joint axis being laterally displaceable from one another. A primary compression spring can be rotatably coupled to the artificial joint body and rotatably coupled to the crank, the primary compression spring being continually compressed between the crank and the artificial joint body through a full range of motion of the artificial joint body. A secondary compression spring can be carried by the artificial joint body and can be separably contactable by the crank. A ball screw spindle can be rotatable by the input motor. A ball nut can be threadably engaged with the ball screw spindle such that rotation of the ball screw spindle results in translation of the ball nut. A connecting arm can extend between the ball nut and the input side of the crank to translate movement of the ball nut into movement of the crank. The input motor can include a rotor, the rotor being fixed relative to the ball screw spindle such that movement of the rotor results directly in movement of the ball screw spindle. Movement of the ball screw spindle can result in the crank transferring force to the artificial joint body about the crank axle and through the primary compression spring to cause the artificial joint body to pivot about the joint axis. A primary pre-loader can be threadably engageable with the primary compression spring, wherein rotating the primary pre-loader results in pre-loading the primary compression spring by compressing the primary compression spring. A secondary pre-loader can be threadably engageable with the secondary compression spring, wherein rotating the secondary pre-loader results in pre-loading the secondary compression spring by compressing the secondary compression spring. A range of motion of the artificial joint body can include: i) a low transmission ratio configuration in which the crank engages both the primary and secondary compression springs; and ii) a high transmission ratio configuration in which the crank remains engaged with the primary compression spring and is separated from contact with the secondary compression spring.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 9A is a kinematic diagram of the torque-sensitive behavior of the present technology, in the low-transmission ratio configuration of FIG. 5A.

FIG. 9B is a kinematic diagram of the torque-sensitive behavior of the present technology, in the high-transmission ratio configuration of FIG. 5B.

Figure 1:
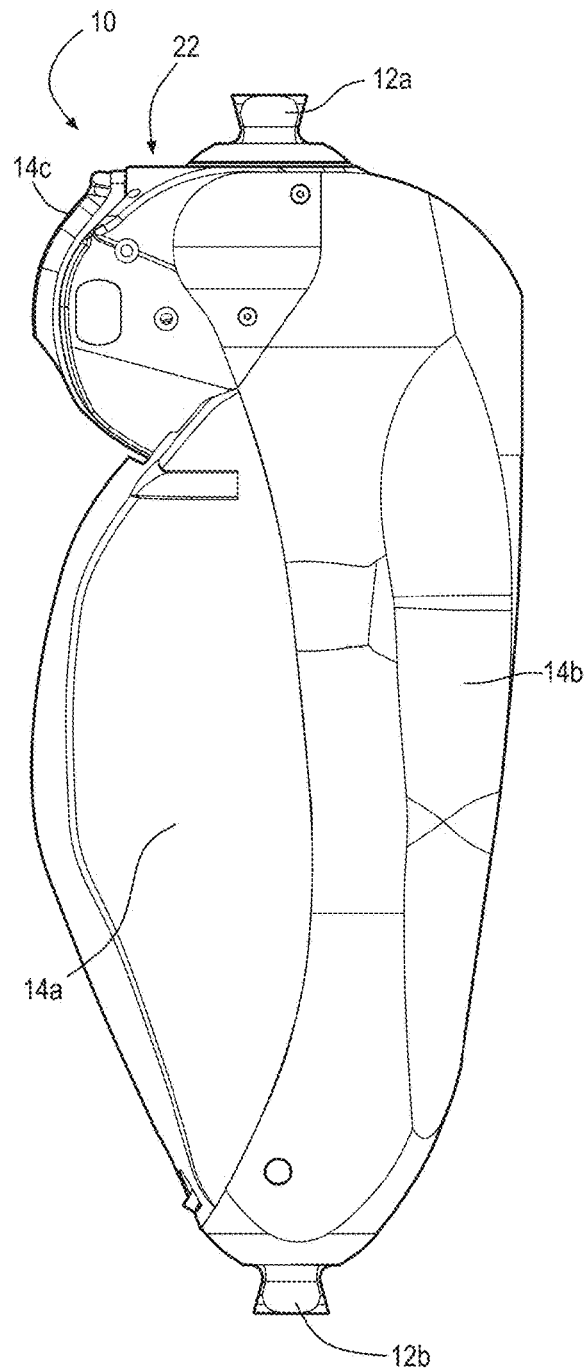
FIG. 1 is a side view of a powered prosthesis in accordance with an aspect of the technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "an axle" can include reference to one or more of such axles, if the context so dictates.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, "fully powered" prosthesis refers to a prosthesis joint that provides powered movement throughout an entire extension and flexion range of motion for the prosthesis. A "fully powered" prosthesis can provide both positive and negative net energy.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

EXAMPLE EMBODIMENTS

The present technology is directed generally to assistive powered prostheses that can be incorporated into a variety of joints that can benefit from variations in transmission ratios depending up on the task involving those joints. This discussion focuses primarily on the use of such systems in human knee prostheses, with the understanding that the scope of the invention is not limited to any particular joint anatomy. In one example, the present technology is directed to embodiments of a powered knee prosthesis for use by individuals with transfemoral amputation. The technology delivers a fully powered knee prosthesis that combines a large-diameter motor with a torque-sensitive actuator with a low transmission ratio. This combination realizes a prosthesis that has low impedance, low weight, low acoustic noise, and high output torque. Benchtop experiments highlight the benefits of low impedance, namely accurate torque and position tracking and high backdrivability. Experiments with a transfemoral amputee show that the device has high torque and speed output, low acoustic noise, and low power consumption.

Powered prostheses have been utilized in a variety of approaches to improve a patient's safety and mobility by adapting to differing terrains and activities. They generally provide net positive energy and actively generate movements with their embedded electromechanical actuators. However, available powered knee prostheses face a fundamental design tradeoff. Conventional electromechanical actuators cannot simultaneously provide optimal stance and swing performance due to the large difference in torque and speed requirements. This fundamental tradeoff negatively affects the powered prosthesis's function, limiting the user's mobility.

In stance, the torque required by a knee prosthesis is generally high and the speed low. Therefore, a large transmission ratio is generally desirable, as it allows the prosthesis to achieve high peak torques with low motor torque, reducing the heat losses in the motor windings. In contrast, in swing, the speed required by a knee prosthesis is generally high and the torque low. Thus, a low transmission ratio is typically preferred as it allows high joint speed with low motor speed, minimizing the back electromotive force (EMF). In addition, a low transmission ratio is desirable in swing because it reduces the inertia and viscous friction reflected from the motor and gear system to the output joint (i.e. the output impedance), which increase with the square of the transmission ratio. Low reflected inertia and friction are necessary to achieve ballistic swing, which is highly desirable in knee prostheses because it is highly efficient, biomimetic, and inherently coordinated with the user's residual limb motion. As a result, the optimal transmission ratios for stance and swing are typically different, leading to a clear design tradeoff.

Variable transmission ratio mechanisms have been proposed to achieve high torque and low impedance with a small motor. By utilizing a high transmission ratio in stance-phase and a low transmission ratio in swing-phase, ballistic swing can be achieved without sacrificing high levels of support in the stance phase. However, many such transmissions are unable to switch between transmission ratios under load. Torque-sensitive actuators have been implemented to continuously and passively vary the transmission ratio while under load using a spring-loaded five-bar mechanism. These actuators can simultaneously reduce the required motor size and output impedance without sacrificing torque. However, torque-sensitive actuators have only been implemented in actuators with high transmission ratios, resulting in suboptimal impedance reduction and high acoustic noise in swing.

The present technology provides a powered prosthesis that combines a relatively large, high-torque motor with a low-torque ratio, torque-sensitive actuator, thereby realizing a fully powered knee prosthesis that does not sacrifice torque, weight, inertia, or noise in exchange for power. A revolute crank axis is utilized that is loaded by two compression springs. In one example, polyurethane springs (Veith Eladur) are used for longer life, high energy density, and low-noise operation. Life-cycle testing on the torque-sensitive mechanism was performed using a custom machine that replicates walking torque-position trajectories according to ISO standards. In this example, the torque-sensitive mechanism withstood more than 3 million cycles, which is a significant improvement over conventional systems.

Figure 2:
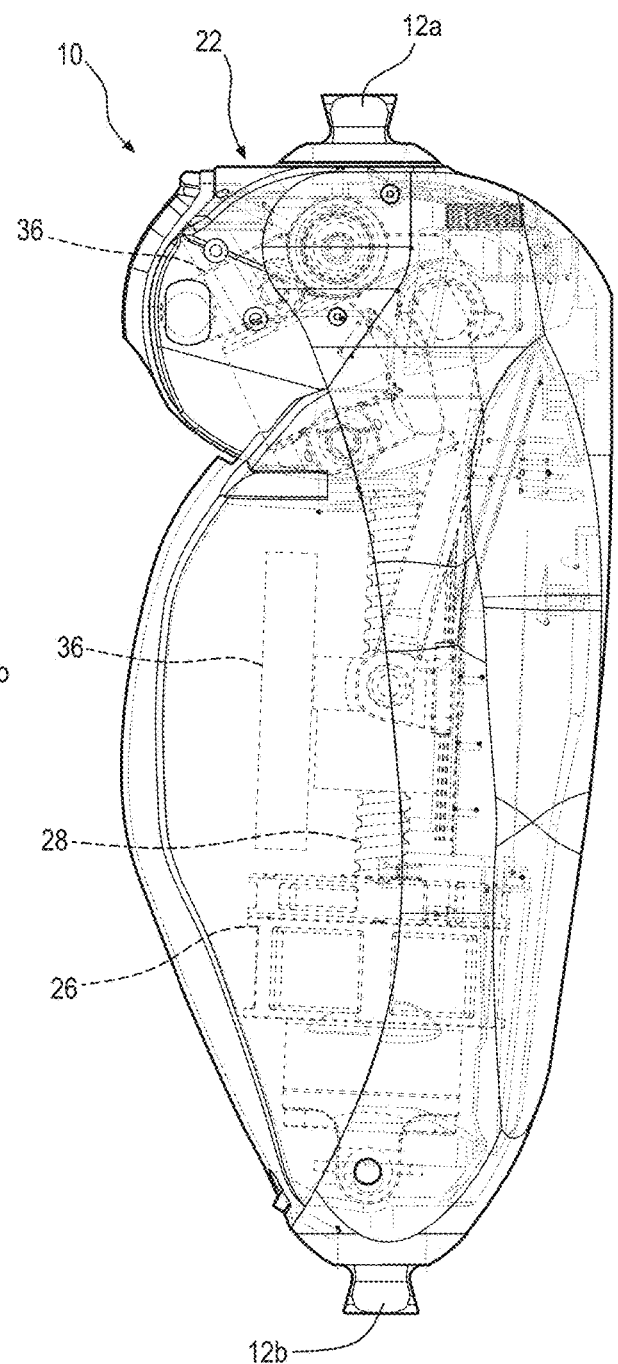
FIG. 2 is a side view of the powered prosthesis of FIG. 1 illustrating in more detail internal components of the prosthesis in accordance with an example.

One exemplary prosthesis device in accordance with the technology is shown at 10 in FIGS. 1 and 2. FIG. 1 shows outer covers or frame sections of the prosthesis as a whole, while FIG. 2 illustrates some internal components in more detail. The device can include upper and lower pyramid adaptors 12a, 12b, to enable connection of the device to the user and/or another prosthetic device or element (e.g. prosthetic sockets, adapters, plates, or the like). One or more frame components or covers 14a, 14b, 14c, etc., can protect the various internal components as housing elements, and can optionally also serve as functional frame members to transfer force to and from other components. Various electronic components are shown schematically at 20 in FIG. 2. These can include power sources, control boards, encoders, data transmission devices, wireless communication devices, etc., that can be carried within the device to provide functionality to the motors, feedback mechanisms, controllers, etc., as will be readily appreciated by one of ordinary skill in the art having possession of this disclosure. Note that neither the position nor the size of these components is precisely represented in the schematic representation of FIG. 2.

Figure 3:
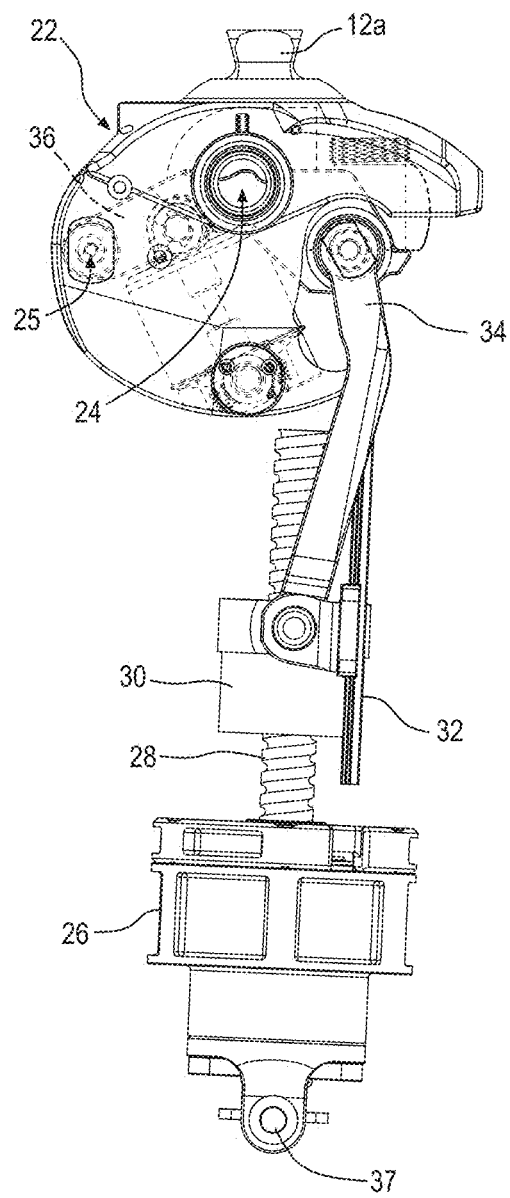
FIG. 3 is a side view of select components of the prosthesis showing the joint in a fully extended configuration in accordance with one example.
Figure 4:
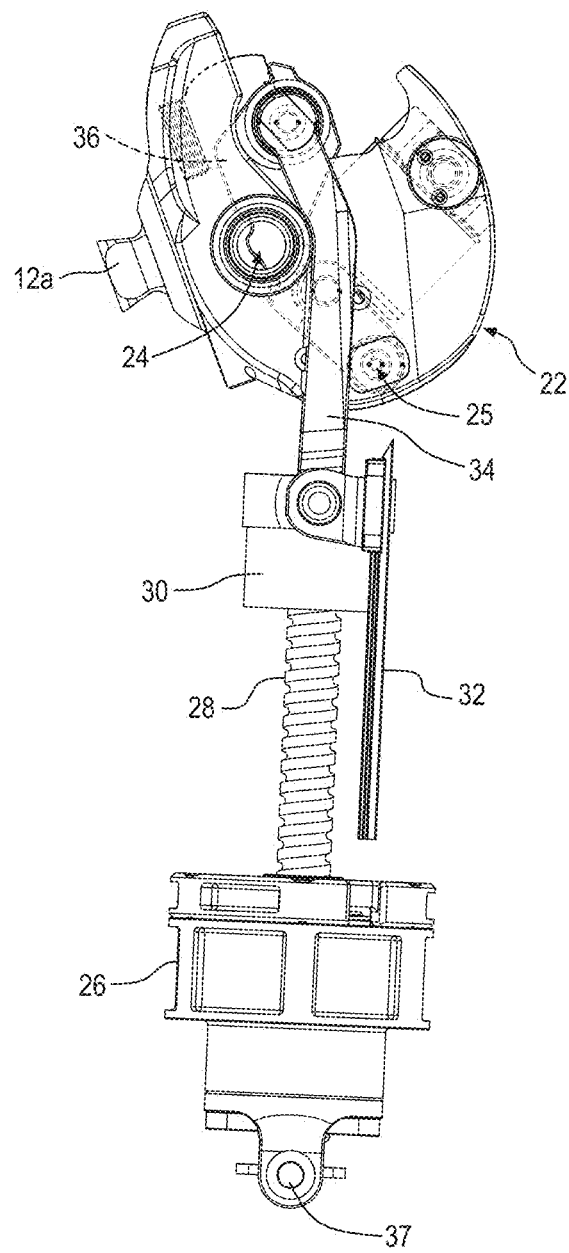
FIG. 4 is a side view of select components of the prosthesis showing the joint in a fully flexed configuration in accordance with one example.

Select internal components of the device are shown in FIGS. 3 through 4, including an artificial joint body 22 that can be pivotal about a joint axis 24. An input motor 26 can, in one aspect, provide rotational output to a ball screw spindle 28. As the motor actuates, the ball screw spindle is rotated, which in turn rotates ball nut 30, which is threadably engaged with the ball screw spindle. Ball nut 30 can be restrained by linear guide 32. As such, rotation of the ball screw spindle results in translation of the ball nut along the linear guide. One or more connecting arms 34 can extend between the ball nut and a crank 36 (discussed in more detail below) to translate movement of the ball nut into movement of the crank. This, in turn, results in movement, e.g., rotation, of the artificial joint body 22 about the joint axis 24 and, accordingly, rotation of the patient's lower prosthetic (not shown) relative to his or her thigh (not shown). Generally, the motor 26 can include or be coupled to a lower connection pin 37 which can be constrained relative to the lower pyramid adapter 12b (FIGS. 1 and 2) directly or indirectly through intermediate elements such as frame component 14b, etc.

FIGS. 3 and 4 collectively illustrate the range of motion through which the artificial joint body 22 is capable of traveling. FIG. 3 represents the fully extended position, e.g., the position of the joint body when the user is standing, while FIG. 4 illustrates the fully flexed position, e.g., the position of the joint body when the user's prostheses are replicating a fully bent knee. The crank 36 is rotatable about a crank axis 25. In the embodiments shown, the joint axis 24 and the crank axis 25 are laterally displaced from one another. This allows the crank to rotate at a differing speed or angle than does the joint body as a whole. The location of pin 25 can define the trajectory of point 40 as a response to changes in output torque. The trajectory of point 40 can also define the transmission ratio (e.g. along with other parameters). In other words, the location of pin 25 has huge effects on the surface shown in FIG. 10A.

Figure 5A:
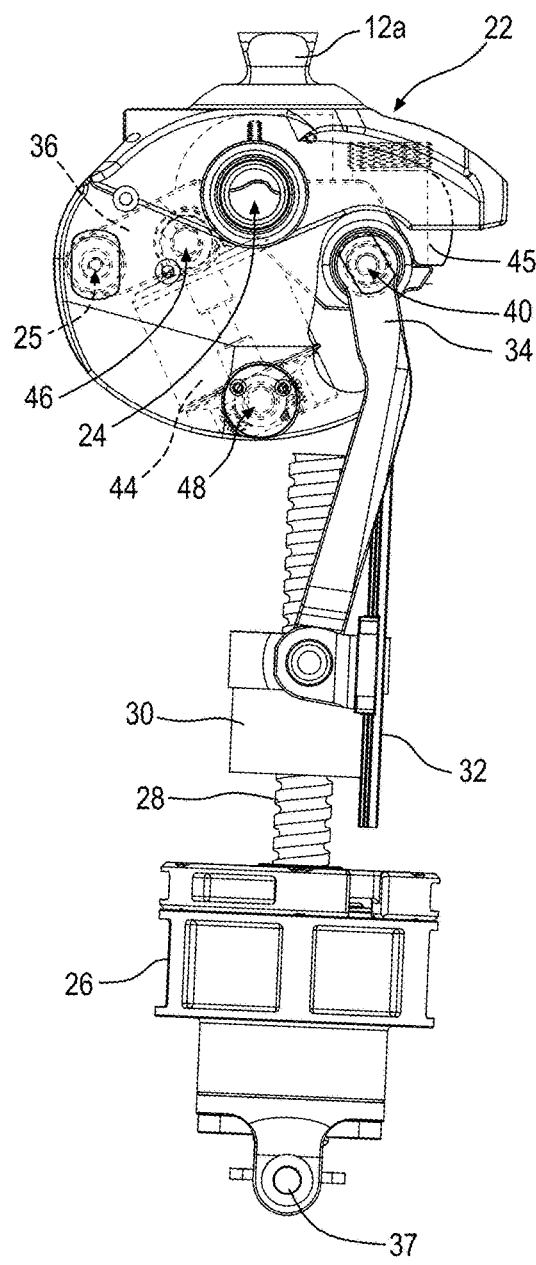
FIG. 5A is a side view of select components of the prosthesis in a low-transmission ratio configuration in accordance with an example.
Figure 5B:
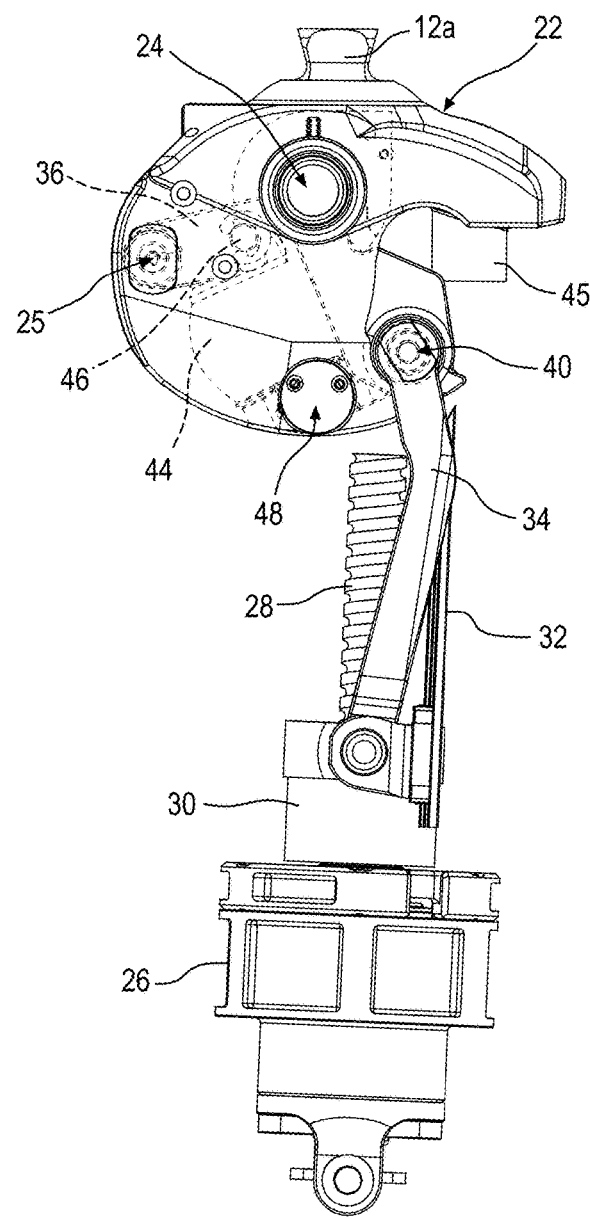
FIG. 5B is a side view of select components of the prosthesis of FIG. 5A in a high-transmission ratio configuration in accordance with an example.

FIGS. 5A and 5B illustrate the artificial joint body 22 in the fully extended position, with FIG. 5A representing a low transmission ratio configuration, and FIG. 5B representing a high transmission ratio configuration. The prosthesis can include a torque-sensitive actuator comprised of a variety of components that continuously and passively vary the transmission ratio of the prosthesis. Because some energy is stored in compression springs (as discussed in more detail below), there is no unified "transmission ratio:" that is, velocity ratio and torque ratio are different quantities. Accordingly, as used herein, the term "transmission ratio" refers to torque ratio.

The transmission is operable to transfer force from the input motor 26 to the artificial joint body 22 while varying the transmission ratio. In one example, the transmission can include, without limitation, the crank 36, and one or more compression springs 44, 45, each of which is discussed in further detail below. The crank 36 can be coupled to a crank axle 37 (see FIGS. 7A and 7B) rotatable about the crank axis 25. The input motor 26 can be operably coupled to the crank such that movement of the input motor causes the crank to pivot about the crank axis. In the example shown, the input motor is operably connected to connecting arm 34, which is rotatably coupled to the crank at 40. A primary compression spring 44 can be carried by the artificial joint body and can be operably coupled to the crank.

In use, actuation of input motor 26 results in rotation of the ball screw spindle 28, which results in ball nut 30 translating up or down relative to the spindle, which in turn results in connecting arm 34 applying force to the crank 36. As the crank moves, it transfers force to the artificial joint body 22 about the crank axle 37 (FIGS. 7A and 7B) and through the primary compression spring 44 to cause the artificial joint body to pivot about the joint axis 24.

Figure 6A:
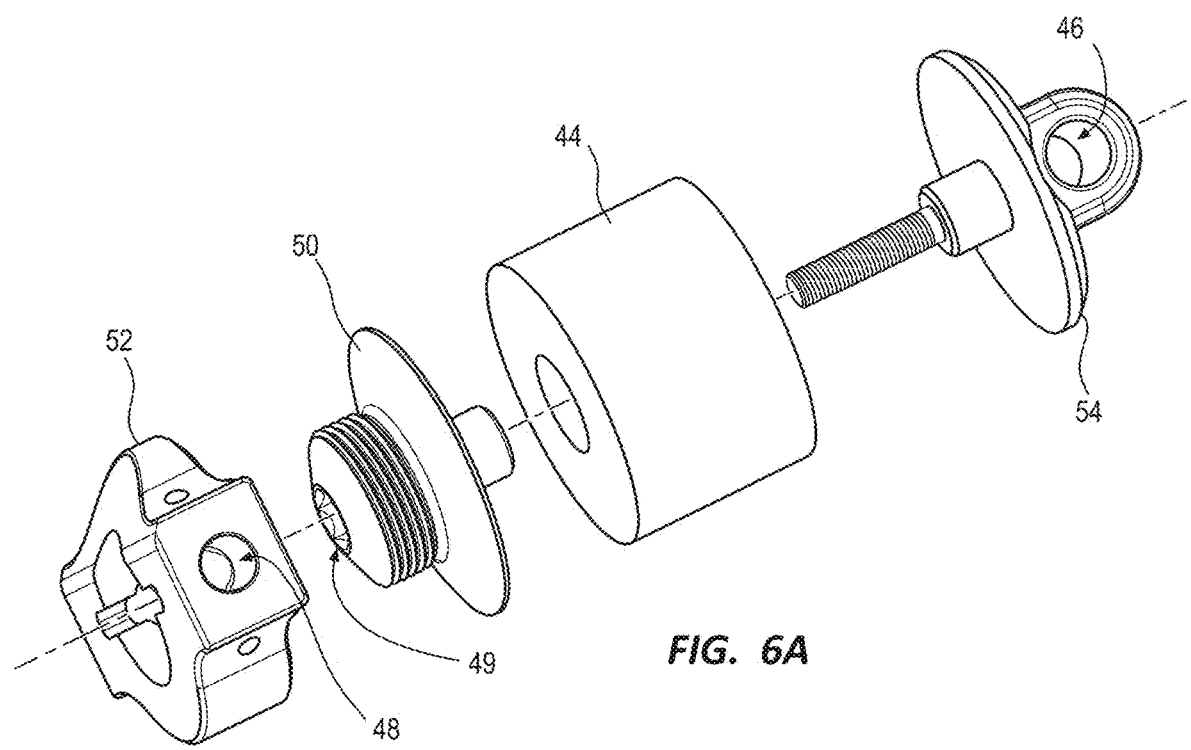
FIG. 6A is a perspective, exploded view of a primary compression spring and pre-loader assembly in accordance with an embodiment of the technology.

The primary compression spring 44 can be coupled on one end to the crank 36 and on an opposing end to a portion of the artificial joint body (e.g., one or more of the frames or covers 14a, 14b, 14c rigidly fixed relative to the joint body). In one embodiment, the primary compression spring is rotatably coupled to the crank at 46 and rotatably coupled to the portion of the artificial joint body at 48. These rotatable/pivotal connections prevent the primary compression spring from buckling during movement of the joint. The primary compression spring can be continually compressed between the crank and the artificial joint body through a full range of motion of the artificial joint body. As shown in FIG. 6A, a primary pre-loader 50 can be threadably engageable with the primary compression spring 44. Rotation of the primary pre-loader results in pre-loading the primary compression spring by compressing the primary compression spring. The pre-loader can be rotated by, in one example, a wrench inserted in the pre-loader at 49. The primary pre-loader can be threaded into a base 52 that can be rotatably attached to the artificial joint body 22 at 48 (see FIG. 3). An opposing cap 54 can threadably engage the pre-loader and can be rotatably attached to the artificial joint body at 46.

Figure 6B:
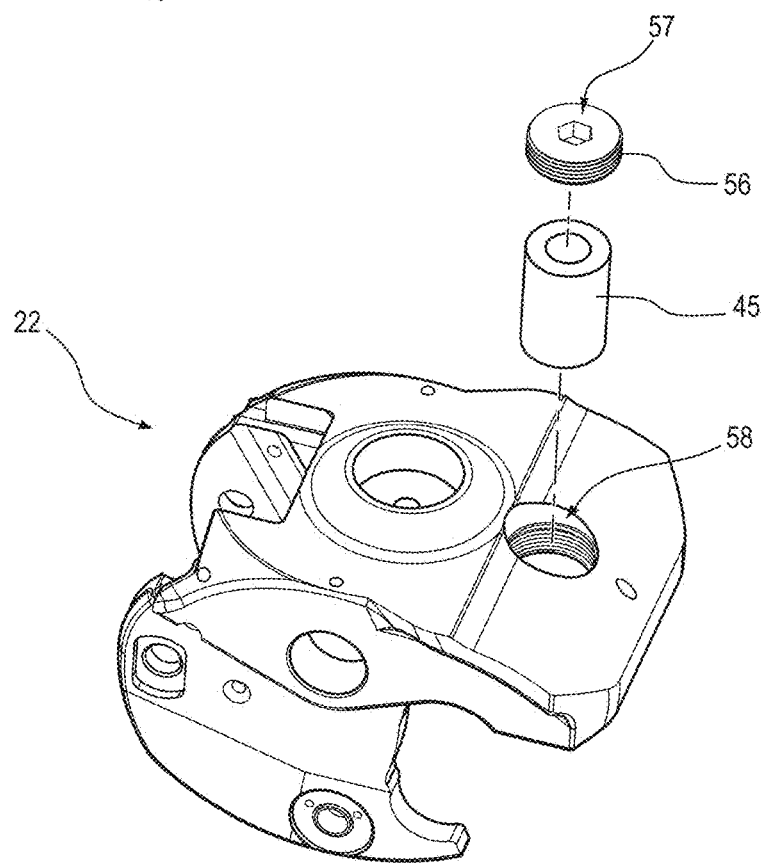
FIG. 6B is a perspective, exploded view of a secondary compression spring and pre-loader assembly in accordance with an embodiment of the technology.

The transmission can also include a secondary compression spring 45, carried by the artificial joint body 22 and contactable by the crank 36. As shown in FIG. 6B, a secondary pre-loader 56 can be threadably engageable with the secondary compression spring. The secondary pre-loader can be threadably engaged in opening 58 of a frame of the artificial joint body 22, and can be rotated, in one example, by a wrench inserted in the pre-loader at 57. Adjusting the secondary pre-loader, when the device is in the position shown in FIGS. 3 and 5A, results in applying, or lessening, a pre-load experienced by the secondary compression spring as it is compressed between the crank and the artificial joint body.

Generally, the crank 36 is in separable contact with the secondary compression spring 45. In other words, one end of the secondary compression spring is uncoupled relative to the crank. A range of motion of the artificial joint body 22 can include: i) a low transmission ratio configuration in which the crank 36 engages both the primary 44 and secondary 45 compression springs (see FIGS. 3 and 5A, for example); and ii) a high transmission ratio configuration in which the crank remains engaged with the primary compression spring and is separated from contact with the secondary compression spring. The system is continuously variable through the range of motion, e.g., between and including these high and low configurations. In one aspect of the technology, a torque produced by the pre-load force of the secondary compression spring by the secondary pre-loader about the crank axis is substantially equal to the torque required to be produced by the motor about the crank axis to rotate the crank to a position that is equal to the preloaded position when the secondary spring is absent. In another aspect, a pre-load force applied to the secondary compression spring by the secondary pre-loader is substantially equal to a force required to rotate the artificial joint body to a position in which the crank no longer contacts the secondary compression spring.

Figure 7A:
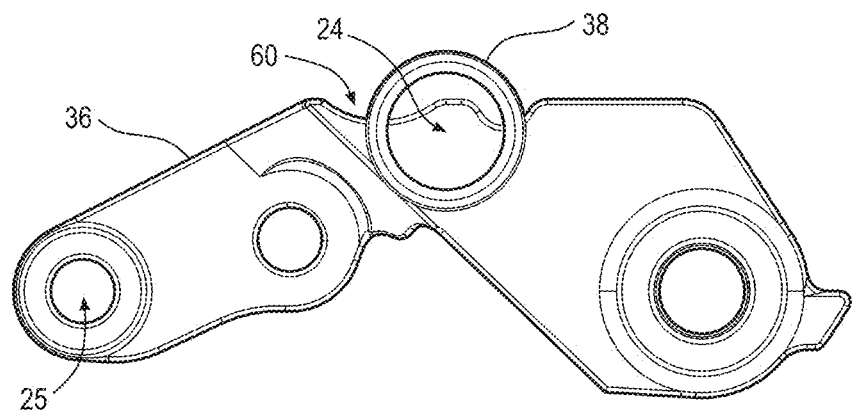
FIG. 7A is a side view of a crank and a joint axle of an example of the prosthesis.
Figure 7B:
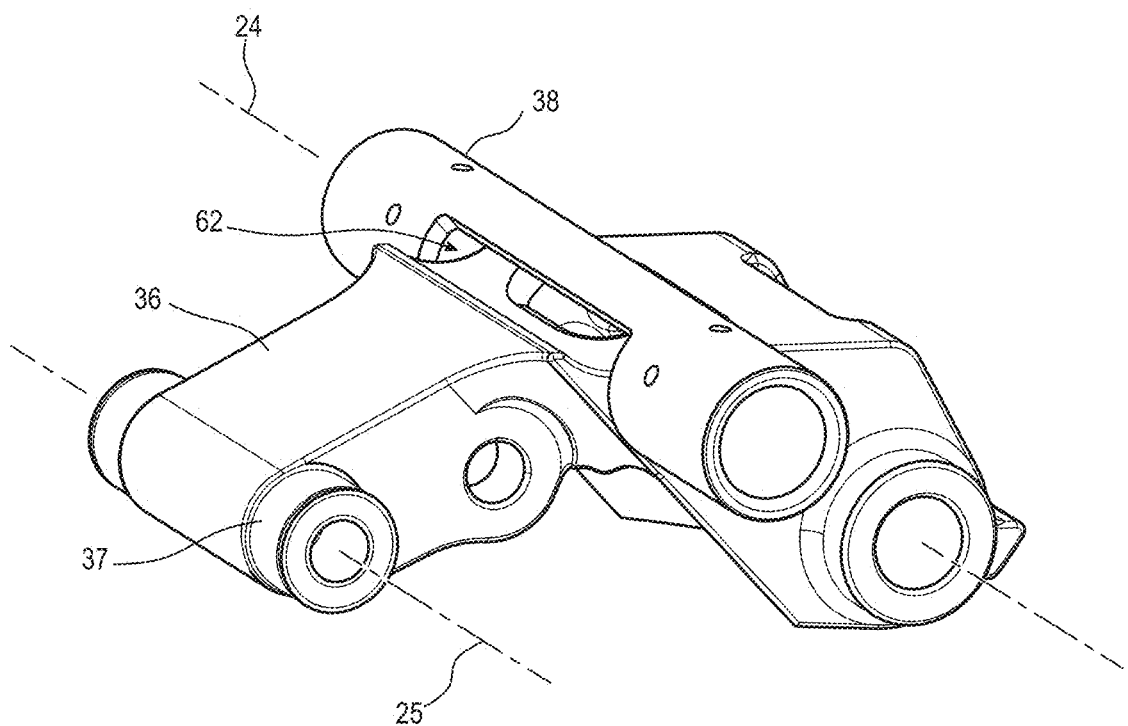
FIG. 7B is a perspective view of the crank and joint axle of FIG. 7A.

The current system is thus a revolute torque-sensitive mechanism including a crank 36 loaded by two compression springs (44, 45). FIGS. 7A and 7B show the crank 36 in greater detail. A joint axle 38 can be coupled to the artificial joint body 22 coincident with the joint axis 24, such that the artificial joint body rotates about joint axis 24. The crank can be coupled to a crank axle 37 coincident with crank axis 25, such that the crank rotates about the crank axis. The crank can include a crank notch or depression or cutout 60 (FIG. 7A) formed therein. At least a portion of the joint axle 38 can be positionable in the crank notch. Alternately or additionally, the joint axle 38 can include an axle notch or depression or cutout 62 (FIG. 7B) formed therein. At least a portion of the crank can be positionable within the axle notch. This arrangement allows the crank and the axle to be compactly installed within the artificial joint body while also providing the desired degree of relative movement between the two. In the example shown, a width of the axle notch can be greater than a width of the at least a portion of the crank positionable within the axle notch, such that the crank can nest withing the axle notch.

Alternatively, other embodiments may replace the notched joint axle with a split joint axle. The two halves of the split joint axle may be offset laterally such that they do not restrict the range of motion of the crank. A device with a split joint axle may, however, exhibit less stiffness under torsional loads, which can be considerable in a lower-limb prosthesis.

Figure 8:
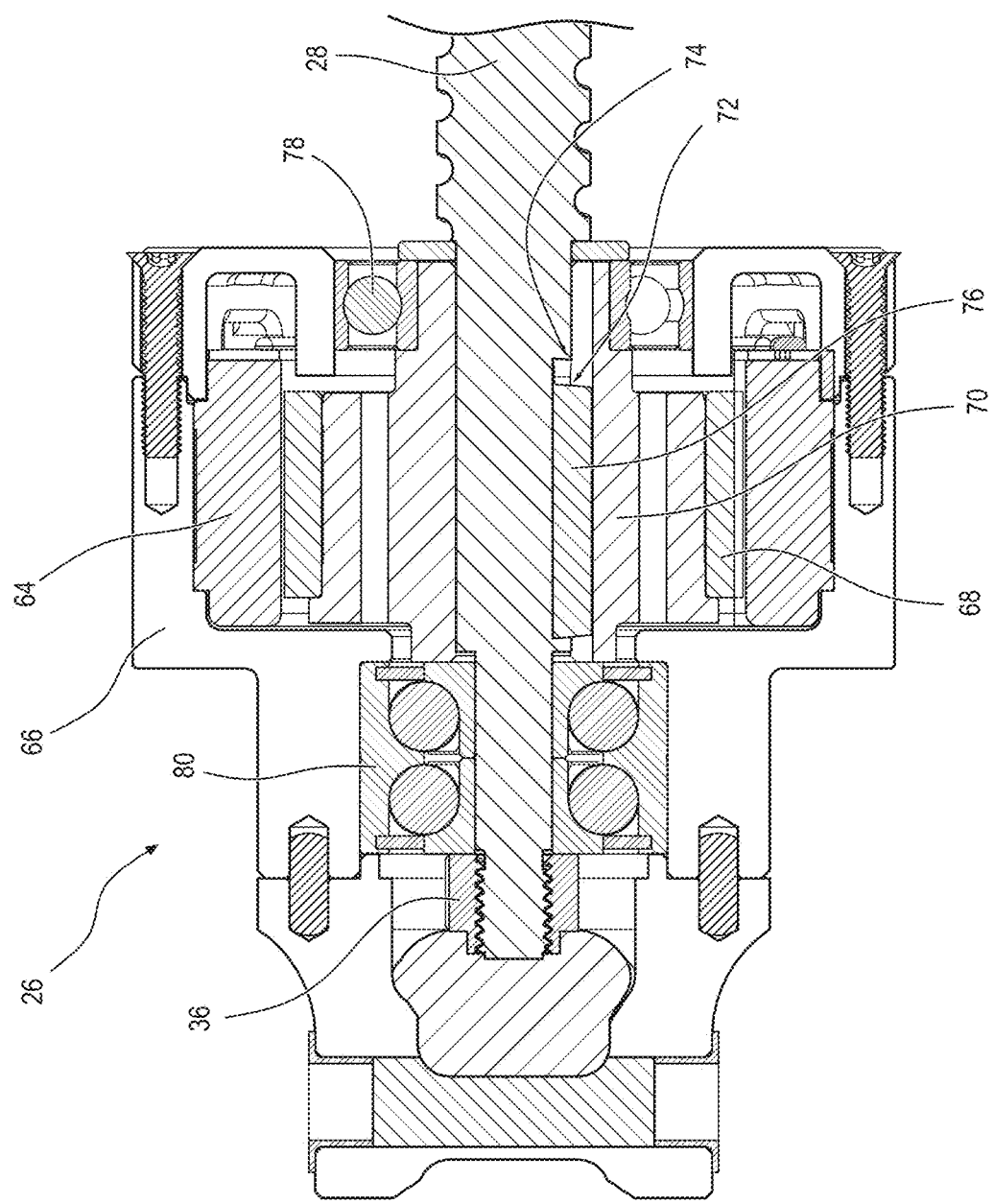
FIG. 8 is a side, partially sectioned view of an input motor in accordance with an aspect of the technology.

FIG. 8 illustrates further details of one example of motor 26. The motor can include a stator 64 within a stator housing 66. The stator housing can be coupled directly to the structural portion of the shank frame 14b and bonded or fixed to the stator. A rotor 68 can rotate within the stator, and can have a rotor adaptor 70 fixed or bonded thereto. The rotor adaptor can include an adaptor key slot 72 formed therein. The spindle 28 can include a spindle key slot 74 formed therein. A key 76 can be positioned in each of the adaptor key slot and the spindle key slot to thereby fixedly attach them one to another. The motor can also include radial bearing 78 constrained with respect to the ball screw, angular contact bearing 80 and lock nut 82, which constrains the rotor and ball screw axially. In this manner, the rotor 68 of the input motor 26 is fixed relative to the ball screw spindle 28, without the presence of any transmission components, such as gears or couplers, such that movement of the rotor of the input motor results directly in movement of the ball screw spindle. The lack of gears, couplers, and the related additional bearings results in a device with reduced complexity and reduced acoustic noise levels. Notably, although an electric motor is exemplified above, and in the figures, other input motors can be used. Non-limiting examples of suitable input motors can include pneumatic actuators, hydraulic actuators, and the like as long as the chosen input motor can produce force for transfer by the transmission as described herein.

FIGS. 9A and 9B are kinematic diagrams of the torque-sensitive behavior of the present technology. FIG. 9A illustrates the low-transmission ratio configuration, corresponding to the physical configuration shown in FIG. 5A. FIG. 9B illustrates the high-transmission ratio configuration, corresponding to the physical configuration of FIG. 5B. The proposed torque-sensitive actuator (FIG. 5C) is based on a five-bar linkage with two degrees of freedom. The first degree of freedom is the angle of the knee joint. The other is the angle of the crank. Intuitively, the mechanism acts like a four-bar linkage with variable geometry. The ball screw ($P_1$) (28 in FIG. 5A) drives the connecting bars ($\overline{R_2 R_3}$) (34 in FIG. 5A), which push and pull on the crank ($\overline{R_6 R_3}$) (36 in FIG. 5A). The crank ($\overline{R_6 R_3}$), the primary spring ($\overline{R_5 P_2 R_4}$), and the secondary spring ($\overline{R_7 P_3 R_8}$) constitute the torque-sensitive mechanism, which is fully contained within the thigh portion of the device (e.g., the artificial joint body 22). To generate extension torque, the motor pulls on the connecting bars and crank, inducing a moment about the crank axis ($R_6$) (25 in FIG. 5A). As a result, the primary spring ($P_3$) (44 in FIG. 7A) compresses and the secondary spring ($P_2$) (45 in FIG. 7A) extends, shifting the location of the output crank axis ($R_3$) (40 in FIG. 7A) downward and away from the joint center ($R_1$) (24 in FIG. 7A), thus increasing the moment arm and transmission ratio. Therefore, the transmission ratio is proportional to the output extension torque.

The primary spring provides the reaction force necessary for the knee to generate a desired extension torque. Pivots on either side of the primary spring ($R_4$ and $R_5$) (46 and 48 in FIG. 7A) ensure that the primary spring is always in pure compression. Moreover, a metal end stop limits the maximum angle of the crank axis. This end-stop limits the deformation of the primary spring, constraining the maximum torque ratio that can be achieved by the torque-sensitive mechanism.

The secondary spring is only active during the initial range of motion of the torque-sensitive mechanism and serves two different purposes. The first function is shock absorption. The secondary spring provides a soft end-stop, reducing shock loads and acoustic noise when the crank returns to the low-transmission ratio position during the unloading phases. The second function is stiffness modulation. Combined, the primary spring (44) and secondary springs (45) act as a dual-rate degressive spring system. At low knee extension torques (one such configuration shown in FIG. 5A), both the primary and secondary springs are in contact with the crank. In this case, the two springs act in parallel, resulting in high equivalent torsional stiffness about the crank axis ($R_6$) (25 in FIG. 5A). Above a certain knee extension torque, the secondary spring is no longer in contact with the crank (FIG. 5 E), and only the primary spring provides reaction force. In this case, the equivalent torsional stiffness about the crank axis is lower ($R_6$) (25 in FIG. 5A). Due to this softening stiffness behavior (i.e., degressive spring), the torque-sensitive actuator is less sensitive at lower torques than at higher torques. This variable sensitivity allows for full modulation of the transmission ratio during ambulation while ensuring a high dynamic response to changes in torque.

In one example the primary (44) and secondary (45) springs can be formed as polyurethane cylinders. Eladur springs manufactured by Veith are used in some embodiments and have shown to produce longer life, high energy density, and low-noise operation than conventional systems. The springs, however, can be formed from a variety of materials and in a variety of configurations, including coil springs, leaf springs, metallic springs, and the like.

There is synergy between the actuator's low transmission ratio and the actuator's torque sensitivity. When abruptly applying a torque, the crank must move to deflect the primary and secondary springs to transfer this torque to the artificial joint body. Therefore, some portion of the power from the motor is used to increase the device's internal kinetic energy (moving the motor and springs but not the artificial joint body), rather than supporting the user (propelling the user forward or pushing them up a step). By minimizing the reflected inertia of the motor by reducing the transmission ratio, the internal dynamic terms are also minimized (that is, smaller forces are required to achieve the same acceleration). Therefore, the crank deflects much quicker and the user feels the torque from the motor sooner. Because the internal dynamic terms are an important limiting factor in the kinematic design, minimizing the internal dynamic terms allows the present system to be designed with high torque sensitivity (e.g., higher crank range of motion, higher change in transmission ratio). This permits the use of an even smaller motor with even less inertia, allowing even more torque sensitivity. Thus, the two systems synergize.

Figure 10A:
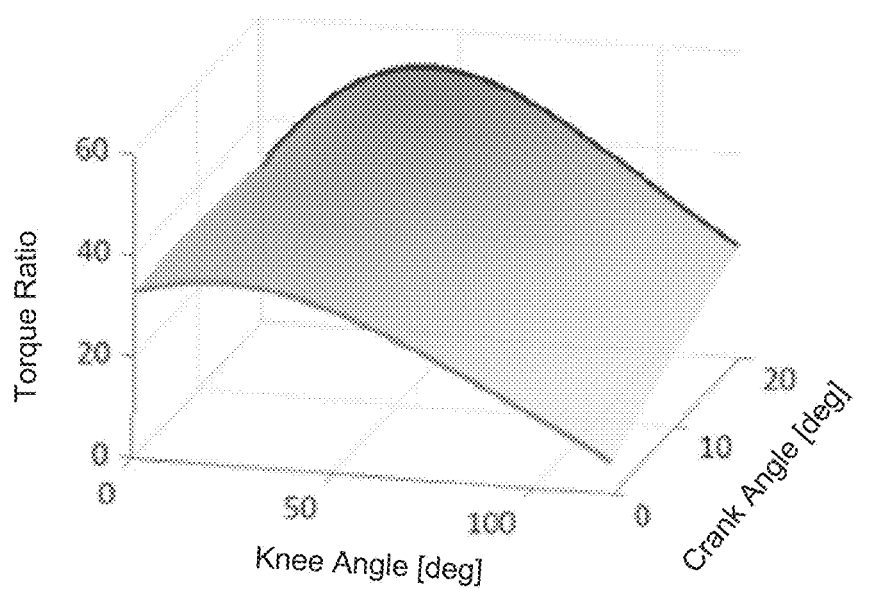
FIG. 10A is a data chart illustrating transmission ratio as a function of knee joint angle and crank angle in accordance with one aspect of the technology.

While the embodiments above are discussed in association with a knee prosthesis, the present technology can be incorporated into prostheses for a variety of joints. Generally, the location of the crank axis 25 defines the trajectory of point 40 as a response to changes in output torque. The trajectory of point 40 defines the transmission ratio (along with some other parameters). In other words, the location of joint axis 25 effects the surface shown in FIGS. 10A-10C. The size and placement of crank 36 determine the device's range of motion and the device's minimum and maximum torque ratio (FIG. 10A). Different biological joints have different ranges of motion and will likely have a desirable peak torque ratio at a different joint angle. For example, an elbow/forearm prosthesis will likely require a similar range of motion as a knee prosthesis, but the peak torque ratio may be at a more flexed angle if predominantly elbow extension torques are applied. As a result, the location of kinematic point 40 may move slightly. The kinematics of the system would likely not change for application to a different joint, but the angles/lengths of the realized implementation may differ.

While motor 26 is shown and described herein as an electrical motor providing rotational output, it is understood that a variety of motor types can be utilized to provide movement to the crank 36, including hydraulic motors, pneumatic motors, etc.

Testing:

Due to the absence of direct onboard knee torque measurements, the example device's open-loop torque-tracking capability was validated by fixing both ends of the device to an aluminum frame. Step torques of 20 and 40 Nm (Newton-meter) were commanded for both flexion and extension, and the knee torque was measured with an external force-torque sensor (Sunrise Instruments M3713D). Each condition was tested five times.

Even without implementation of open-loop compensations, step-response torque tracking was very accurate due to the low output impedance. In the extension direction, the 20 Nm and 40 Nm steps exhibited a mean rise time of 8.8 ms and 13.2 ms, respectively, and a mean overshoot of 32% and 47%, respectively. In the flexion direction, the 20 Nm and 40 Nm steps exhibited a mean rise time of 6.4 ms and 6.8 ms, respectively, and a mean overshoot of 54% and 49%, respectively. As expected, there was a slight increase in rise time when applying extension torques due to the compliance of the torque-sensitive mechanism. Across all conditions, the steady-state error was below 10% of the commanded value. The rise time across the four conditions varied from 6.4 to 13.2, resulting in a −3-dB bandwidth of 26-54 Hz. Due to the increase in torque ratio, the required current was ~ 16% lower when applying extension torque than flexion torque.

Figure 11A:
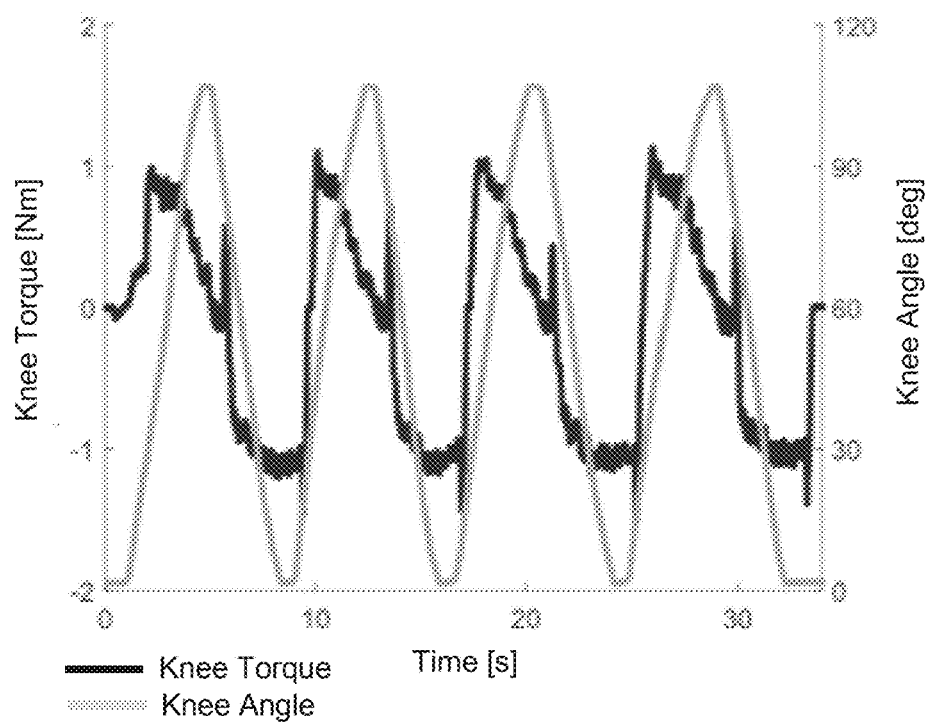
FIG. 11A is a data chart illustrating knee torque and knee angle vs. time in accordance with one benchtop experiment.

To assess the device's output impedance, the thigh segment of the device was fixed to a force-torque sensor and the joint backdriven manually. Backdriving the device with a slow sinusoidal trajectory showed the minimum backdriving torque to be around 1.1 Nm (see FIG. 11A). This torque includes both transmission friction and cogging effects. This value is similar to other prostheses using low-ratio transmissions and significantly less than prostheses using conventional transmissions.

Figure 10B:
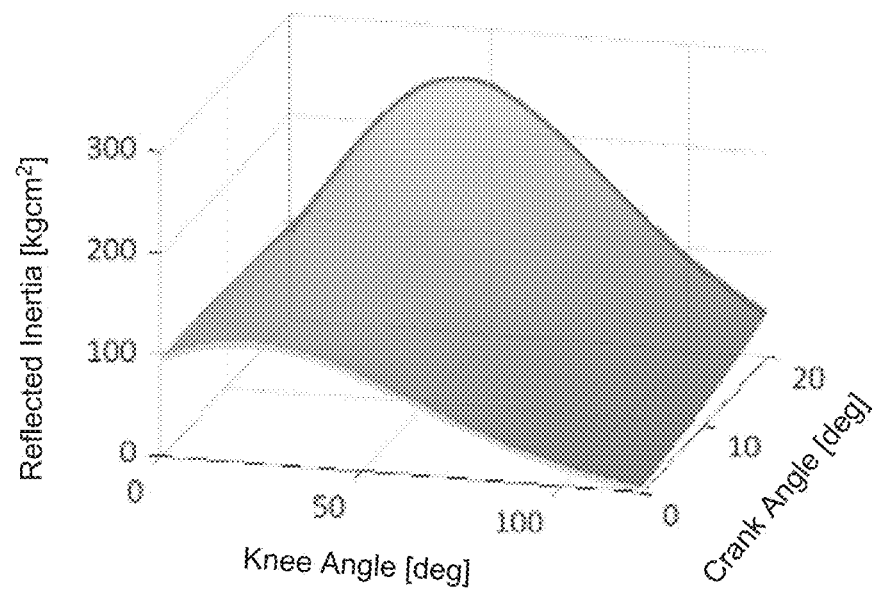
FIG. 10B is a data chart illustrating reflected inertia as a function of knee joint angle and crank angle in accordance with one aspect of the technology.
Figure 10C:
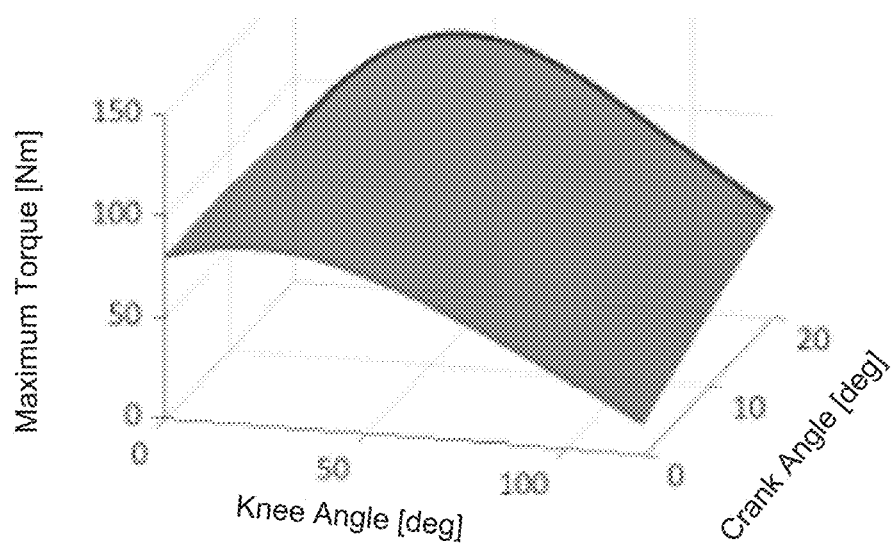
FIG. 10C is a data chart illustrating maximum torque as a function of knee joint angle and crank angle in accordance with one aspect of the technology.

To measure the system impedance at different frequencies, the system was backdriven manually with an approximately sinusoidal trajectory, steadily increasing the frequency from 0.25 Hz to 3 Hz over the span of 60 seconds. FIGS. 10A-10C illustrate torque ration, reflected inertia and maximum torque, respectively, vs. knee angle and crank angle.

Figure 11B:
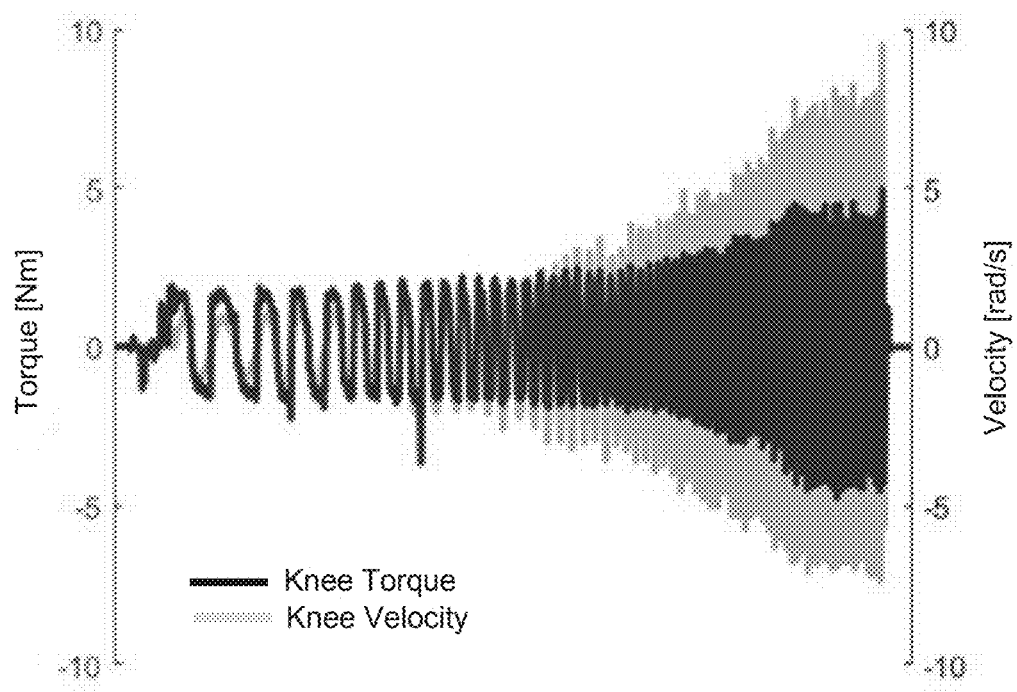
FIG. 11B is a data chart illustrating knee torque vs. velocity associated with the benchtop experiment data of FIG. 11A.
Figure 11C:
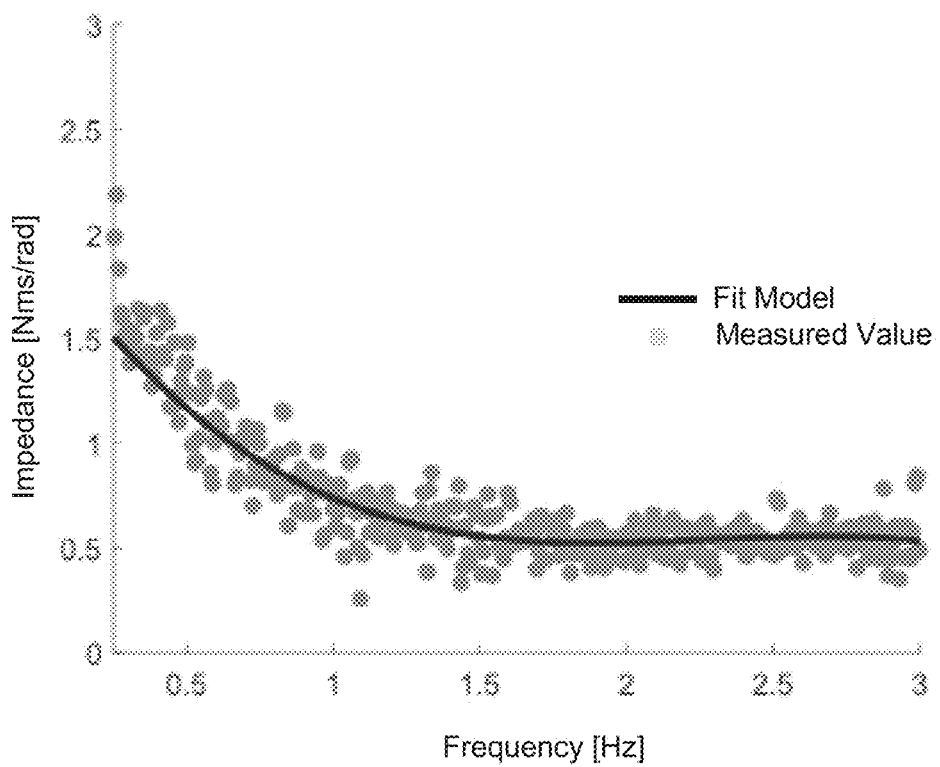
FIG. 11C is a data chart illustrating impedance vs. frequency associated with the benchtop experiment data of FIG. 11A.

Resulting knee velocity and torque are shown in FIG. 11B. The same data is represented in the frequency domain in the bode diagram in FIG. 11C. For the tested frequency range, we estimated the impedance to vary between 0.5 and 1.5 Nms/rad. Even when backdriving the system at 3 Hz, the resulting joint torques were less than 5 Nm.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A powered prosthesis device, comprising:
an artificial joint body, pivotal about a joint axis;
an input motor;
and a transmission, operable to transfer force from the input motor to the artificial joint body, the transmission including:
a crank, pivotally coupled to the artificial joint body about a crank axle rotatable about a crank axis, the input motor being operably coupled to the crank such that movement of the input motor causes the crank to pivot about the crank axis;
and a primary compression spring, carried by the artificial joint body, the primary compression spring being operably coupled to the crank, wherein at least one of:
the primary compression spring is coupled on one end to the crank and on an opposing end to a portion of the artificial joint body,
or the primary compression spring is continually compressed between the crank and the artificial joint body through a full range of motion of the artificial joint body;
wherein movement of the input motor results in the crank transferring force to the artificial joint body about the crank axle and through the primary compression spring to cause the artificial joint body to pivot about the joint axis.

2. The device of claim 1, wherein the primary compression spring is rotatably coupled to the crank and to the portion of the artificial joint body.

3. The device of claim 1, further comprising a primary pre-loader threadably engageable with the primary compression spring, wherein rotating the primary pre-loader results in pre-loading the primary compression spring by compressing the primary compression spring.

4. The device of claim 1, further comprising a secondary compression spring, carried by the artificial joint body and contactable by the crank.

5. The device of claim 4, further comprising a secondary pre-loader threadably engageable with the secondary compression spring, wherein rotating the secondary pre-loader results in pre-loading the secondary compression spring by compressing the secondary compression spring when in contact with the crank.

6. The device of claim 5, wherein the crank is in separable contact with the secondary compression spring.

7. The device of claim 6, wherein a range of motion of the artificial joint body includes: i) a first transmission ratio configuration in which the crank engages both the primary and secondary compression springs; and ii) a second transmission ratio configuration in which the crank remains engaged with the primary compression spring and is separated from contact with the secondary compression spring.

8. The device of claim 1, wherein the joint axis and the crank axis are laterally displaced from one another.

9. The device of claim 1, further comprising:
a ball screw spindle, rotatable by the input motor;
a ball nut, threadably engaged by the ball screw spindle, wherein rotation of the ball screw spindle results in translation of the ball nut; and
a connecting arm, extending between the ball nut and the crank to translate movement of the ball nut into movement of the crank, wherein the input motor includes a rotor, the rotor being fixed relative to the ball screw spindle such that movement of the rotor of the input motor results directly in movement of the ball screw spindle.

10. The device of claim 9, further comprising a rotor adaptor fixedly bonded to the rotor and having an adaptor key slot formed therein, and wherein the spindle includes a spindle key slot formed therein, and further comprising a key positioned in each of the adaptor key slot and the spindle key slot to fixedly attach them one to another.

11. The device of claim 1, further comprising a joint axle, carried by the artificial joint body coincident with the joint axis, and wherein the crank includes a crank notch formed therein, at least a portion of the joint axle positionable in the crank notch.

12. The device of claim 11, wherein the joint axle includes an axle notch formed therein, at least a portion of the crank positionable within the axle notch.

13. The device of claim 12, wherein a width of the axle notch is greater than a width of the at least a portion of the crank positionable within the axle notch.

14. A powered prosthesis device, comprising:
an artificial joint body, pivotal about a joint axle rotatable about a joint axis;
an input motor; and
a transmission, operable to transfer force from the input motor to the artificial joint body, the transmission including:
a crank, pivotally coupled to the artificial joint body about a crank axle rotatable about a crank axis, the input motor being rotatably coupled to the crank such that movement of the input motor causes the crank to pivot about the crank axis, the crank axis and the joint axis being laterally displaced from one another;
a primary compression spring, rotatably coupled to the artificial joint body and rotatably coupled to the crank, the primary compression spring being continually compressed between the crank and the artificial joint body through a full range of motion of the artificial joint body;
a secondary compression spring, carried by the artificial joint body and separably contactable by the crank;
a ball screw spindle, rotatable by the input motor;
a ball nut, threadably engaged with the ball screw spindle such that rotation of the ball screw spindle results in translation of the ball nut; and
a connecting arm, extending between the ball nut and an input side of the crank to translate movement of the ball nut into movement of the crank;
the input motor including a rotor, the rotor being fixed relative to the ball screw spindle such that movement of the rotor results directly in movement of the ball screw spindle;
wherein movement of the ball screw spindle results in the crank transferring force to the artificial joint body about the crank axle and through the primary compression spring to cause the artificial joint body to pivot about the joint axis;
a primary pre-loader threadably engageable with the primary compression spring, wherein rotating the primary pre-loader results in pre-loading the primary compression spring by compressing the primary compression spring; and
a secondary pre-loader threadably engageable with the secondary compression spring, wherein rotating the secondary pre-loader results in pre-loading the secondary compression spring by compressing the secondary compression spring when in contact with the crank;
wherein a range of motion of the artificial joint body includes: i) a first transmission ratio configuration in which the crank engages both the primary and secondary compression springs; and ii) a second transmission ratio configuration in which the crank remains engaged with the primary compression spring and is separated from contact with the secondary compression spring.

15. The device of claim 14, further comprising a rotor adaptor fixedly bonded to the rotor and having an adaptor key slot formed therein, and wherein the spindle includes a spindle key slot formed therein, and further comprising a key positioned in each of the adaptor key slot and the spindle key slot to fixedly attach them one to another.

16. The device of claim 14, wherein the crank includes a crank notch formed therein, at least a portion of the joint axle positionable in the crank notch.

* * * * *